May 5, 1925. 1,536,901

A. LUTZ

MANICURING IMPLEMENT

Filed June 3, 1924

INVENTOR
Arthur Lutz.
BY
ATTORNEY

Patented May 5, 1925.

1,536,901

UNITED STATES PATENT OFFICE.

ARTHUR LUTZ, OF WEST HOBOKEN, NEW JERSEY.

MANICURING IMPLEMENT.

Application filed June 3, 1924. Serial No. 717,665.

*To all whom it may concern:*

Be it known that I, ARTHUR LUTZ, a citizen of Switzerland, residing at West Hoboken, in the county of Hudson and State of New Jersey, have invented certain new and useful Improvements in Manicuring Implements, of which the following is a specification.

This invention relates generally to manicuring implements, having more particular reference to an implement whose operative element or elements is power driven, the invention having for an object the provision of a novel and improved manicuring implement of this sort.

For further comprehension of the invention, and of the objects and advantages thereof, reference will be had to the following description and accompanying drawing, and to the appended claims in which the various novel features of the invention are more particularly set forth.

Fig. 1 is an enlarged longitudinal sectional view thereof showing it arranged for pressing the cuticle back on the nails.

Fig. 2 of the drawing is a side view showing my improved implement.

Figure 1:
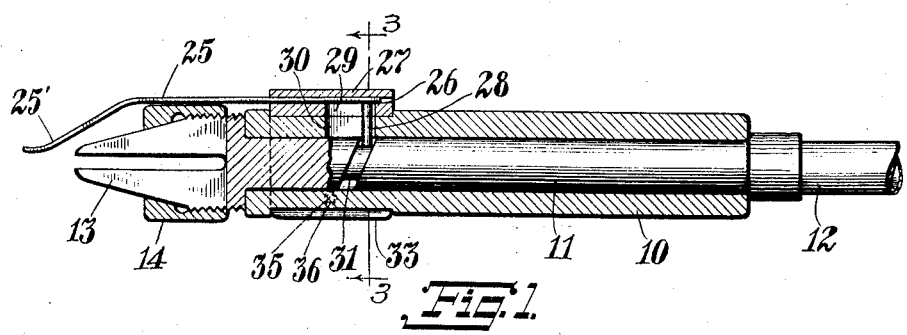
Figure 2:
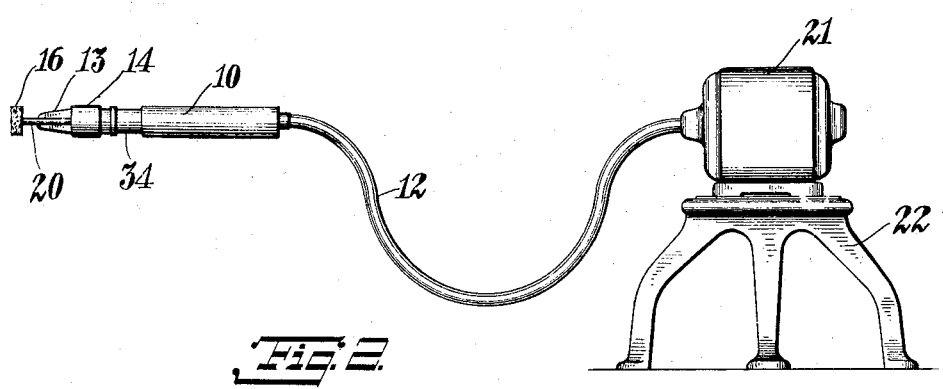
Figure 3:
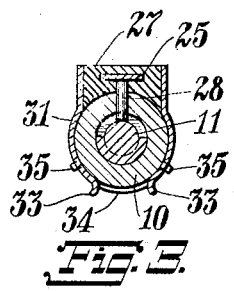
Fig. 3 is a transverse sectional view taken on the line 3—3 of Fig. 2.
Figure 4:
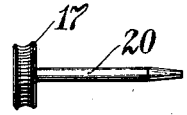
Figs. 4, 5 and 6 are detail side views showing different forms of tools employed on the nails.
Figure 5:
Figure 6:
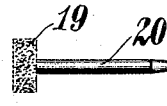

Referring now to the drawing, the reference numeral 10 indicates an elongated tubular element or barrel which forms the handle of my improved implement and which has extending therethrough a spindle 11 which is connected at one end to a flexible shaft 12 and is formed on its other end, which may be designated as its forward end, with a number of jaws 13 adapted to be compressed by a collar 14 threaded on the said forward end, these parts 13 and 14 providing a chuck for gripping the tools. In Fig. 2 of the drawing I have shown a brush 16 as mounted in the chuck, while in Figs. 4, 5 and 6 I have shown at 17, 18 and 19 different forms of files for the nails. These parts 16, 17, 18, and 19 are fixed on suitable shanks 20 which are adapted to be gripped by the jaws 13. The flexible shaft 12 is here shown as driven by an electric motor 21 which is mounted on a stand 22. If desired I might connect the shaft to a motor mounted on a wall, or I might connect a pulley directly to the rear end of the spindle 11 and drive the same through suitable connections from a foot pedal.

In connection with my improved implement I provide a reciprocatory member which is adapted to act on the cuticle at the base of the nail to press the same back. This reciprocatory member comprises a flat bar 25 which is slidably mounted in a suitable guide slot 26 in a block 27 adapted to be removably mounted on the barrel 10. Fixed to the rear end of the bar 25 is a pin 28 which projects inward through registering longitudinal slots indicated at 29 and 30 in the block and the barrel, the pin engaging at its inner end in an oblique circumferential groove 31 in the spindle 11. The block 27 may be mounted on the barrel by means of the curved spring clips 33 which partially surround the barrel, the latter having a shallow circumferential groove 34 in which the block and clips engage. Turning movement of the block on the barrel may be prevented by means of a pair of pins 35 fixed in the sides thereof and engaging in suitable apertures such as 36 in the said clips. As will be apparent, rotation of the spindle 11 will cause the bar 25 to reciprocate by reason of the engagement of the pin 28 in the oblique groove 31. The forward end of the bar may be curved inward over the front end of the chuck as shown at 25'.

While I have illustrated and described a preferred embodiment of my improved invention it is to be understood that I do not limit myself to the precise construction herein shown and that various changes and modifications might be made therein without departing from the spirit and scope of the invention as defined in the appended claims.

Having thus described my invention, what I claim as new and desire to protect by Letters Patent of the United States is as follows:—

1. A manicuring device comprising a barrel, a spindle rotatable therein and formed with an oblique circumferential groove, a chuck on said spindle, a block adapted to be removably mounted on said barrel, a bar slidably mounted in said block, and a pin on said bar engaging in said oblique groove, and spring clips projecting from said block and partially encircling the spindle to hold the block in place thereon.

2. A manicuring device comprising a barrel, a spindle rotatable therein and formed with an oblique circumferential groove, a chuck on said spindle, a block adapted to be removably mounted on said barrel, a bar slidably mounted in said block, and a pin on said bar engaging in said oblique groove, and spring clips projecting from said block and partially encircling the spindle to hold the block in place thereon, said barrel having a circumferential groove in which said block and clips engage.

3. A manicuring device comprising a barrel, a spindle rotatable thereon and formed with an oblique circumferential groove, a chuck on said spindle, a block adapted to be removably mounted on said barrel, a bar slidably mounted in said block, and a pin on said bar engaging in said oblique groove, and spring clips projecting from said block and partially encircling the spindle to hold the block in place thereon, and pins projected from said barrel and engaging in apertures in said clips to hold the block against rotary movement on said barrel.

In testimony whereof I have affixed my signature.

ARTHUR LUTZ.